US012774217B2

(12) United States Patent
Mays et al.

(10) Patent No.: US 12,774,217 B2
(45) Date of Patent: Oct. 27, 2026

(54) PROCESS FOR PRODUCING LITHIATED TRANSITION METAL OXIDES

(71) Applicant: BASF Corporation, Florham Park, NJ (US)

(72) Inventors: William C. Mays, Farmington Hills, MI (US); Benjamin Reichman, West Bloomfield, MI (US); Martin Lawrence Panchula, Beachwood, OH (US)

(73) Assignee: BASF Corporation, Florham Park, NJ (US)

( * ) Notice: Subject to any disclaimer, the term of this patent is extended or adjusted under 35 U.S.C. 154(b) by 423 days.

(21) Appl. No.: 18/496,977

(22) Filed: Oct. 30, 2023

(65) Prior Publication Data

US 2024/0076201 A1 Mar. 7, 2024

Related U.S. Application Data

(62) Division of application No. 16/678,706, filed on Nov. 8, 2019, now Pat. No. 11,905,184.

(60) Provisional application No. 62/757,875, filed on Nov. 9, 2018.

(51) Int. Cl.

| | |
|---|---|
| ***C01G 53/42*** | (2025.01) |
| ***B01J 6/00*** | (2006.01) |
| ***C01G 53/506*** | (2025.01) |
| ***C01G 53/84*** | (2025.01) |

(52) U.S. Cl.

CPC .............. *C01G 53/42* (2013.01); *B01J 6/004* (2013.01); *C01G 53/506* (2025.01); *C01G 53/84* (2025.01); *C01P 2004/03* (2013.01); *C01P 2004/61* (2013.01); *C01P 2006/40* (2013.01)

(58) Field of Classification Search

None

See application file for complete search history.

(56) References Cited

U.S. PATENT DOCUMENTS

| | | | |
|---|---|---|---|
| 5,955,051 | A | 9/1999 | Li et al. |
| 6,899,860 | B2 | 5/2005 | Suita et al. |
| 8,758,455 | B2 | 6/2014 | Pitteloud et al. |
| 10,526,213 | B2 | 1/2020 | Garella et al. |
| 10,658,664 | B2 | 5/2020 | Wohlfahrt-Mehrens et al. |

(Continued)

FOREIGN PATENT DOCUMENTS

| | | | |
|---|---|---|---|
| CN | 1192193 | A | 9/1998 |
| CN | 1226876 | A | 8/1999 |

(Continued)

OTHER PUBLICATIONS

First Office Action dated Oct. 24, 2023 from corresponding Japanese Patent Appln. No. 2021-525209, and a machine generated English translation.

(Continued)

*Primary Examiner* — Colin W. Slifka

(74) *Attorney, Agent, or Firm* — Peter T. DiMauro

(57) ABSTRACT

Provided are processes for the formation of electrochemically active materials such as lithiated transition metal oxides that solve prior issues with throughput and calcination. The processes include forming the materials in the presence of a processing additive that includes potassium prior to calcination that produces active materials with increased primary particle grain sizes.

9 Claims, 4 Drawing Sheets

(56) References Cited

U.S. PATENT DOCUMENTS

| | | | | |
|---|---|---|---|---|
| 2012/0244413 | A1 | 9/2012 | Shimano | |
| 2016/0248077 | A1 | 8/2016 | Momo | |
| 2018/0309124 | A1* | 10/2018 | Kanada | H01M 10/052 |

FOREIGN PATENT DOCUMENTS

| | | | |
|---|---|---|---|
| CN | 107001068 | A | 8/2017 |
| CN | 108025923 | A | 5/2018 |
| EP | 2403043 | A1 | 1/2012 |
| JP | 2014089848 | A | 5/2014 |
| JP | 2017-226576 | A | 12/2017 |
| JP | 2000-515478 | | 11/2020 |
| KR | 10-2016-003898 | | 4/2016 |
| KR | 20160038984 | A | 4/2016 |
| WO | 2014/069469 | A1 | 5/2014 |
| WO | 2017/061633 | A1 | 4/2017 |

OTHER PUBLICATIONS

Second Office Action dated Jul. 29, 2023, of counterpart Chinese Patent Application No. 201980073276.3, along with an English machine translation.

Office Action dated Jan. 19, 2023, of counterpart Chinese Patent Application No. 201980073276.3, along with an English machine translation.

Extended European Search Report from corresponding EP Patent Appln. No. 19881219 dated Jun. 30, 2022.

Rejection Decision dated Nov. 16, 2023, of counterpart Chinese Patent Application No. 201980073276.3, along with an English translation.

Ning., "Advanced Inorganic Synthesis," East China University of Science and Technology Press, pp. 53 and 54, 2007, in English.

Second Office Action dated Apr. 2, 2024 from corresponding Japanese Patent Appln. No. 2021-525209, and a machine generated English translation.

* cited by examiner

PROCESS FOR PRODUCING LITHIATED TRANSITION METAL OXIDES

FIELD

The invention relates to the formation of electrochemically active materials suitable for use in primary or secondary batteries, and more particularly to the formation of lithiated transition metal oxides.

BACKGROUND

The formation of electrochemically active materials for use in batteries typically involves two primary steps. First, a precursor is formed by such as by co-precipitation reactions whereby transition metals are intermixed in the form of hydroxides or carbonates to form a precursor powder. This precursor is then mixed with a lithium compound and calcined under high temperature to form an active material.

There is great desire to improve the electrochemical performance of the active material formed in these processes as well as reduce costs of production. The performance of electrode materials for use in lithium ion batteries is improved by reducing particle size of the electrode materials. This is generally due to three main advantages of small particle size. First, smaller particle size correlates with larger surface areas that are believed to result in improved charge transfer kinetics. Second, small particle size improves the diffusion kinetics of lithium ions into the interiors of the particles leading to greater capacity at higher charge/discharge rates. Finally, smaller particles result in a larger effective contact surface with the electrolyte which correlates with a greater probability to incorporate lithium ions from the electrolyte and improving power density of the cell. As such, attempts to reduce the particle size of the active materials is an ongoing area of research. Recent developments have been able to achieve nanoscale particle sizes.

Prior efforts at improving cell performance, while successful in many respects, have yet to achieve full theoretical capacity of these active materials. As such there remains a need for improved processes of forming electrochemically active materials for use in an electrochemical cell.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

Provided are methods that improve the resulting electrochemical capacity of electrochemically active materials, such as lithiated transition metal oxides. Processes include formation of a lithiated transition metal oxide that includes intermixing a transition metal precursor, a processing additive, and a lithium compound to form an active material precursor, and heating the active material precursor to a temperature optionally of 700° C. or greater in an oxidizing atmosphere, the heating for a calcination time sufficient to form a lithiated transition metal oxide having a plurality of primary particles having a grain size. Without being limited to one particular theory, it is believed that improved transport of actives in the oxidizing atmosphere is achieved by increasing the grain size of the active material precursor when combined with the processing additive, optionally by formation of grain sizes within pre-defined ranges, improves the overall resulting material. Optionally, a processing additive is added to the system prior to a first calcination. Optionally, an active material precursor is subjected to a first calcination (optionally prior to exposure to processing additive) and the resulting particles are then intermixed with a processing additive to form a second lithiated transition metal oxide with a grain size larger than the first grain size achieved following the first calcination. The second lithiated transition metal precursor may then be subjected to a second calcination. A processing aid optionally includes potassium and is optionally a potassium salt, optionally a carbonate or hydroxide of potassium. The processing additive may be present at 0.1 weight percent to 10 weight percent. In some aspects, improved results may be achieved by forming a particle with a grain size of 2 μm or greater, optionally 2 μm to 15 μm, optionally 4 μm to 15 μm. In some aspects, the molar ratio of lithium to transition metal in the active material precursor is 0.8 to 1.1. In some aspects, the transition metal precursor optionally includes Ni, Co, Mn, Al, Mg, Ti, Zr, Nb, Hf, V, Cr, Sn, Cu, Mo, W, Fe, Si, B, other transition metals, or rare earth elements, or any combination thereof. A lithium compound is optionally lithium hydroxide, lithium oxide, lithium carbonate, lithium nitrate, lithium sulfate, lithium acetate, lithium peroxide, lithium hydrogen carbonate, a lithium halide, or combinations thereof. Optionally, the step of heating is in an oxidizing atmosphere, optionally an oxygen or ozone enriched atmosphere, where "enriched" is relative to the oxygen or ozone level in earth atmospheric air at sea level. The step of heating is optionally at a temperature is 700° C. to 1000° C. A calcination time is optionally 1-60 hours. The formed lithiated transition metal oxide resulting from the processes as provided herein optionally have a crush strength of less than 40 Newtons. The lithiated transition metal oxide is optionally crushed and optionally precharged for subsequent use in an electrochemical cell or other desired use.

BRIEF DESCRIPTION OF THE DRAWINGS

The aspects set forth in the drawings are illustrative and exemplary in nature and not intended to limit the subject matter defined by the claims. The following detailed description of the illustrative aspects can be understood when read in conjunction with the following drawings and in which:

DETAILED DESCRIPTION

Figure 1:
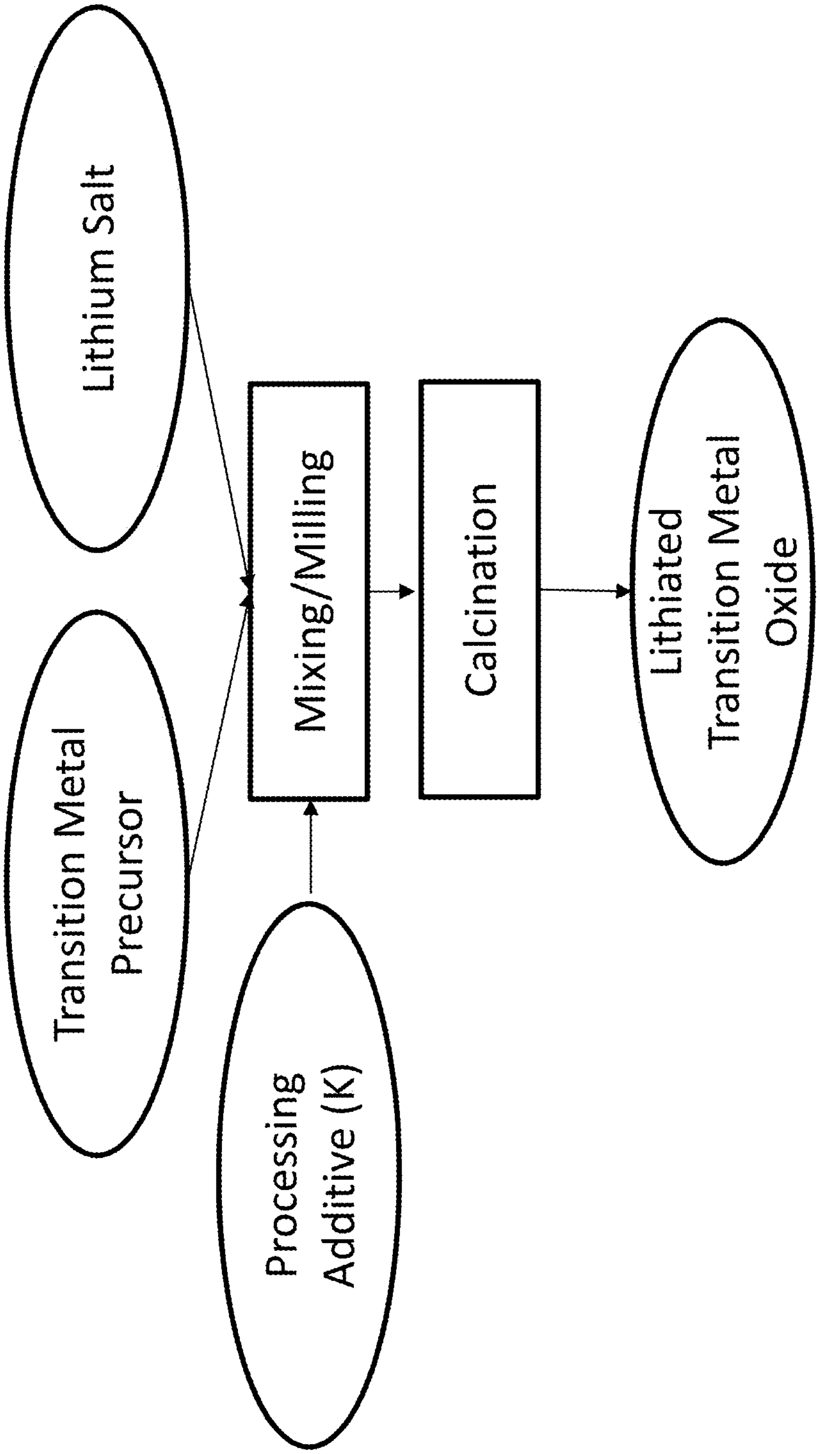
FIG. 1 illustrates a schematic of a process of forming a lithiated transition metal oxide as provided herein according to some aspects.
Figure 2A:
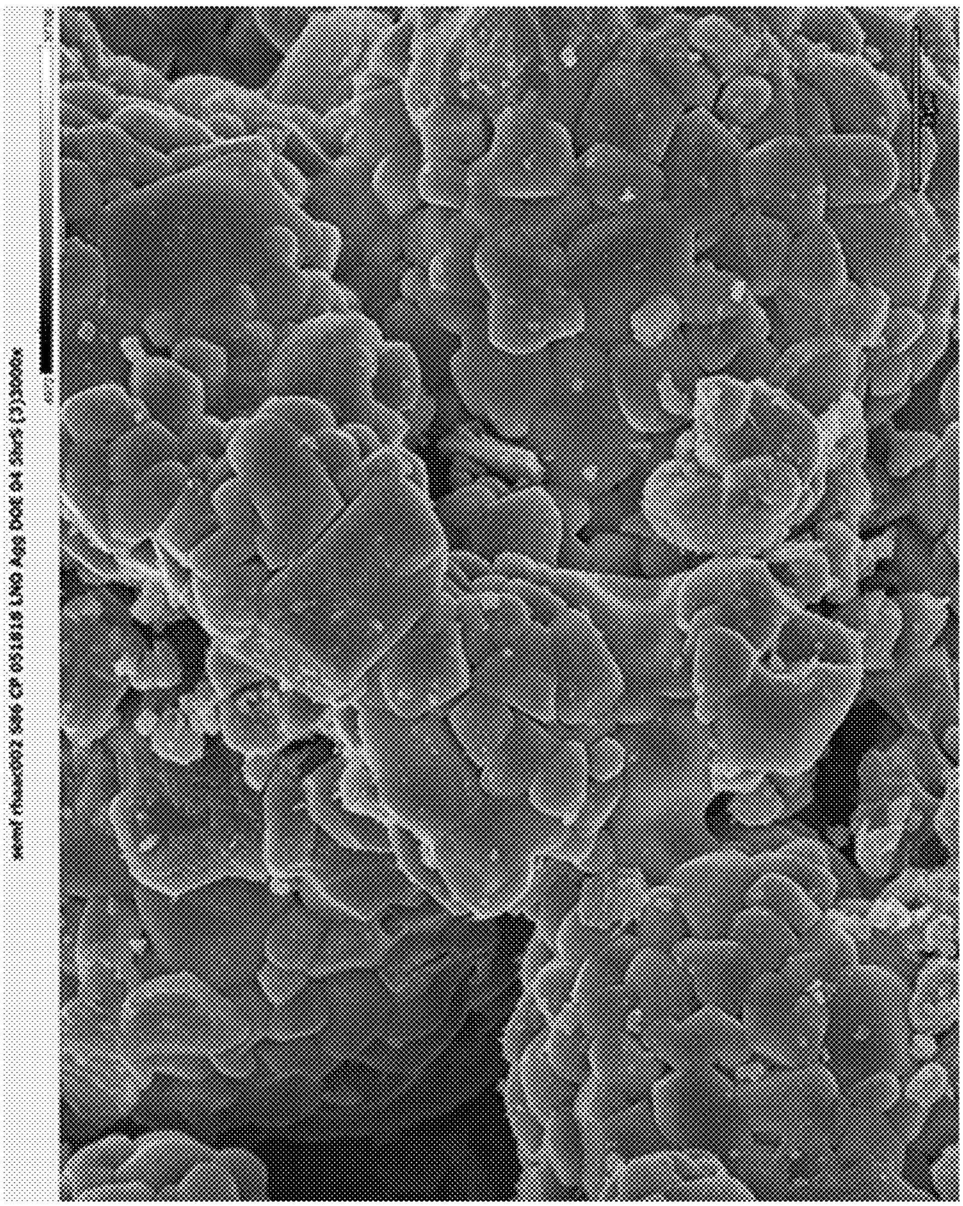
FIG. 2A illustrates a scanning electron microscope image (5 μm scale) of $LiNiO_2$ particles formed in the absence of a $K_2CO_3$ processing additive and calcined illustrating relatively small primary particle grain size.
Figure 2B:
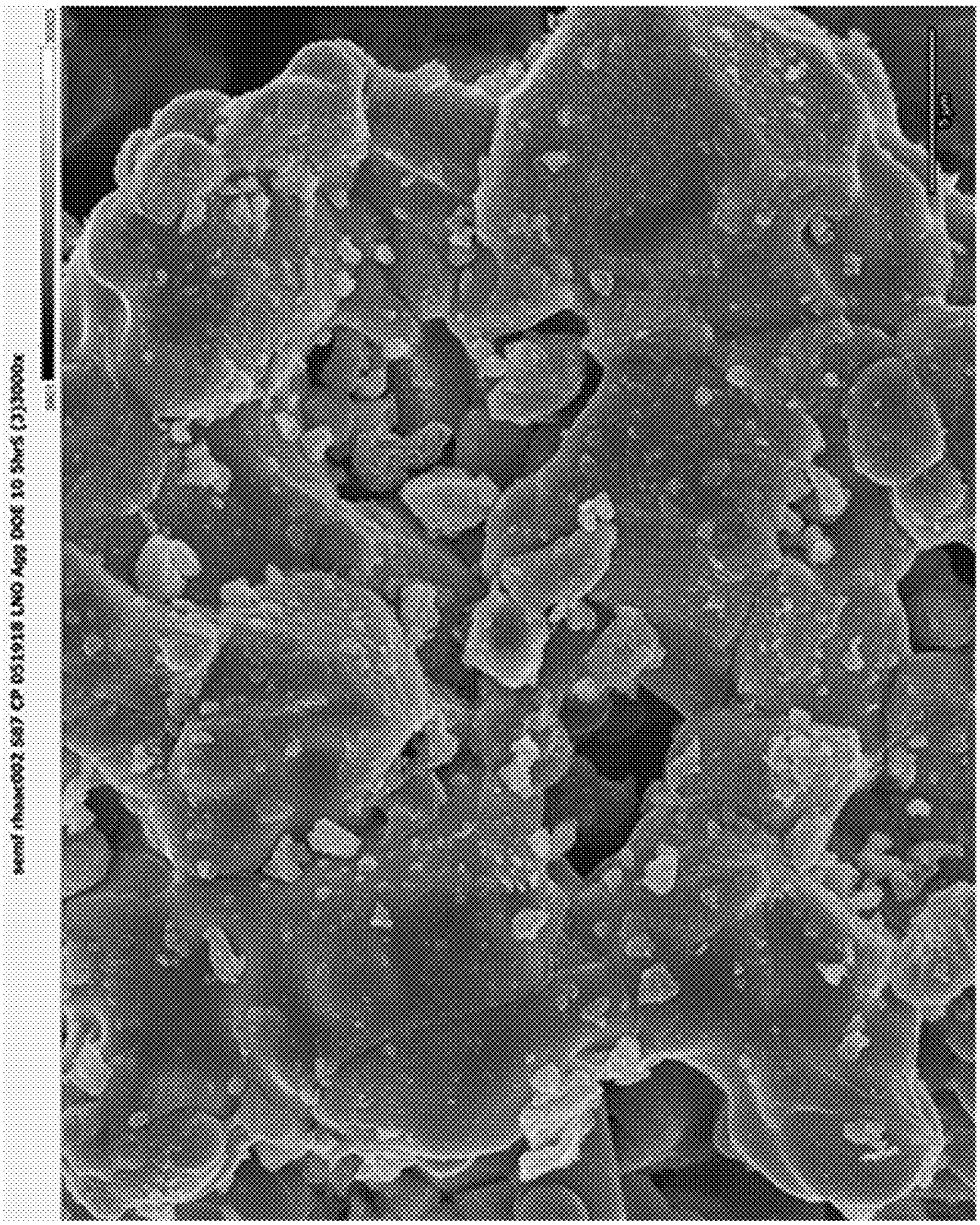
FIG. 2B illustrates a scanning electron microscope image (5 μm scale) of $LiNiO_2$ particles formed in the presence of a $K_2CO_3$ processing additive and calcined illustrating relatively large primary particle grain size.
Figure 3B:
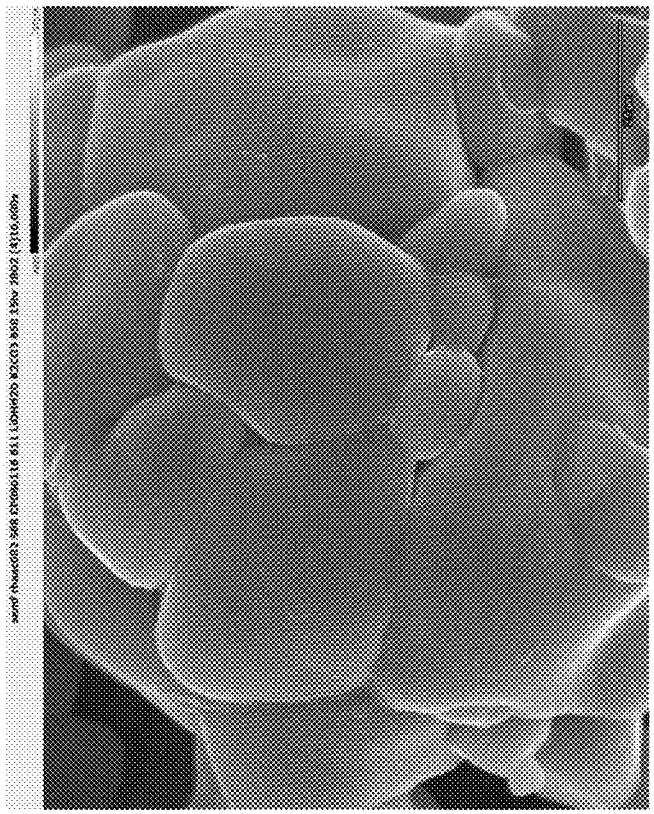
FIG. 3B illustrates a scanning electron microscope image (2.5 μm scale) of $LiNi_{0.8}Co_{0.1}Mn_{0.1}O_2$ particles formed in the presence of a $K_2CO_3$ processing additive and calcined illustrating relatively large primary particle grain size.
Figure 3A:
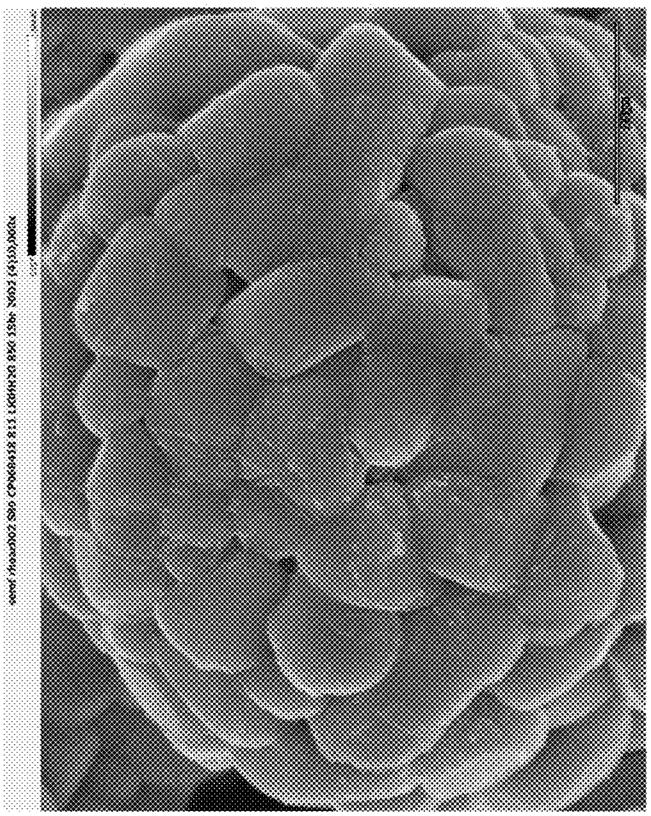
FIG. 3A illustrates a scanning electron microscope image (2.5 μm scale) of $LiNi_{0.8}Co_{0.1}Mn_{0.1}O_2$ particles formed in the absence of a $K_2CO_3$ processing additive and calcined illustrating relatively small primary particle grain size.

The present disclosure is directed to new processes of forming electrochemically active materials optionally for use in an electrochemical cell. Instead of focusing on composition or structure of such active materials, the present invention reduces the time necessary to produce electrochemically active materials by reducing the calcination time and in some aspects the hardness of the material following calcination. It was found that intentionally forming relatively large primary particle sizes prior to calcination improves throughput of the calcination reaction and improves material handling in calcination and downstream processes. Prior methods of producing electrochemically active materials result in final primary particle sizes of less than 500 nm. These small primary particle sizes are considered desirable due to electrochemical performance. However, it was found by the present inventors that improved performance can be achieved with decreased production times/costs by increasing the size of the primary particles prior to final calcination. As such, the present processes are in direct contradiction to prior methods in that they result in relatively large grain sizes, optionally with grain sizes on the order of 2 μm or greater in diameter. It is these relatively large grain sizes of material that are subjected to the calcination reaction.

In addition, the provided processes address the need for reduced cost at least due to greater throughput and more effective formation of electrochemically active materials. Estimates of cost of production indicate that the use of large grain sizes as described herein in the production of electrochemically active materials will have costs that are significantly reduced relative to prior processes.

As used herein, the term "lithiated transition metal oxides" refers to metal oxides, optionally mixed metal oxides, that contain lithium and at least one transition metal where the material has been subjected to calcination.

As used herein, the term "transition metal precursor" refers to a transition metal in the form of a hydroxide, oxide, oxyhydroxide, carbonate, or nitrate.

As used herein, the term "lithium compound" refers to a lithium containing composition in the form of a lithium hydroxide, lithium oxide, lithium carbonate, lithium nitrate, lithium sulfate, lithium acetate, lithium peroxide, lithium hydrogen carbonate, or a lithium halide.

As used herein, the term "active material precursor" refers to a product of an intermixing between a lithium compound, a transition metal precursor, and in some aspects a processing additive as provided herein.

As used herein, the term "calcination" is understood as a thermal treatment in the presence of an oxidizing atmosphere so as to cause a chemical transformation of the material.

A temperature as provided herein is optionally absolute as described or about the temperature defined as ±10° C. from the absolute number as described.

An "grain size" as used herein is a discernable structure with increased diameter (average cross sectional dimension) relative to material produced in the absence of a processing additive as provided herein, typically with a grain size of 0.5 micrometers (μm) or greater. Grain size is measured by microscopy such as transmission electron microscopy rather than by standard particle size analyzers.

Processes are provided of forming an electrochemically active material suitable for optionally reversibly intercalating Li. Optionally, an electrochemically active material is a transition metal oxide, an iron phosphate, titanate active materials, LiMnO systems that may or may not include other elemental constituents, or LiCoO systems that may or may not include other elemental constituents. Illustrative examples of transition metal oxide electrochemically active materials include, but are not limited to chemistries based on LiNiMO where M is optional in the material and may be any transition metal, rare earth or combinations thereof. While much of the present disclosure is directed to transition metal oxide electrochemically active materials such as those that are predominantly Ni on an atomic basis, it is appreciated that the processes of increasing primary particle grain size and calcining are equally attributable to other electrochemically active materials as well.

It was found that by intermixing a processing additive that includes potassium with active material precursors a relatively large grain size of the primary particle may be achieved during a calcination reaction. Without being limited to one particular theory, it is believed that the larger grain size promotes improved transport of the oxidizing atmosphere or components thereof during calcination thereby permitting formation of a suitable final product with reduced calcination time. In addition, some aspects of the processes provided herein provide a material that has reduced hardness relative to prior methods thereby improving subsequent processibility for final incorporation into electrodes or other suitable uses. As such, in some aspects a process as provided in this disclosure includes: intermixing a transition metal precursor, a lithium compound, and a processing additive to form an active material precursor; and heating the active material precursor to a temperature of 700° C. or greater in an oxidizing atmosphere, the heating for a calcination time sufficient to form a lithiated transition metal oxide with a grain size of the primary particles of 0.5 mm or greater. In some aspects, a transition metal precursor and a lithium compound are first intermixed, subjected to a first calcination, then the particles are subjected to intermixing with a processing additive and subjected to a second calcination reaction to form relatively larger primary particle grain sizes.

It is appreciated that a process includes forming an active material precursor prior to or simultaneously with combining with a processing additive. An active material precursor is formed by intermixing a Li compound with a transition metal precursor. Optionally, an active material precursor is formed by intermixing a transition metal precursor with a Li compound in the absence of other materials or in the absence of a processing additive. Optionally, a processing additive is combined with the active material precursor after it has been subjected to a calcination. Alternatively, a processing additive is intermixed with a transition metal precursor and a Li compound simultaneously whereby the Li compound and the transition metal precursor were optionally not significantly or intentionally intermixed prior to combination with the processing additive.

A lithium compound as used herein is any suitable lithium compound known in the art for formation of electrochemically active materials, optionally a lithium hydroxide, lithium oxide, lithium carbonate, lithium nitrate, lithium sulfate, lithium acetate, lithium peroxide, lithium hydrogen carbonate, a lithium halide, or combinations thereof.

The lithium compound is intermixed with a transition metal precursor. A transition metal precursor may be formed by any method known in the art. In some aspects, a transition metal precursor may be formed by a co-precipitation reaction whereby hydroxides, carbonates, nitrates, or other known suitable transition metal form is used to form a solution. By adjusting the pH of the solution, precipitates of transition metals form a transition metal precursor.

The step of intermixing of the transition metal precursor and the lithium compound and optionally the processing additive may be performed at various temperatures, optionally from 0° C. to 100° C. or even greater, optionally from 10° C. to 40° C. The intermixing may be performed at any suitable pressure, optionally about 1 atmosphere.

A transition metal may be any transition metal suitable for use in an electrochemical cell. Illustrative examples of a transition metal include, but are not limited to Ni, Co, Mn, Al, Mg, Ti, Zr, Nb, Hf, V, Cr, Sn, Cu, Mo, W, Fe, Si, B, or other transition metals. Optionally, a transition metal as used herein includes or excludes a rare earth metal. A rare earth metal is optionally La, Nd, Y, among others. In some aspects, a transition metal precursor includes Ni, Mn, Co, Fe, or combinations thereof. In some aspects, a transition metal precursor includes Ni.

In some aspects a transition metal precursor includes Ni at an atomic percentage (at %) relative to other transition metals in the transition metal precursor of 10 at % or greater, optionally 20 at % or greater, optionally 30 at % or greater, optionally 40 at % or greater, optionally 50 at % or greater, optionally 60 at % or greater, optionally 70 at % or greater, optionally 80 at % or greater, optionally 90 at % or greater, optionally 95 at % or greater, optionally 96 at % or greater, optionally 97 at % or greater, optionally 98 at % or greater, optionally 99 at % or greater. Optionally, the atomic percentage of Ni is from 70 at % to 99 at % or greater. Optionally, the atomic percentage of Ni is from 80 at % to 99 at % or greater. Optionally, the atomic percentage of Ni is from 90 at % to 99 at % or greater. Optionally, Ni is the only transition metal designed in or present in the material such that Ni is present at substantially 100 at %.

Optionally, a transition metal precursor includes Ni and one or more other transition metals. One or more other transition metals (other than Ni) are optionally each individually present at 0 at % to 90 at %, optionally 1 at % to 90 at %. Optionally, one or more other transition metals are each individually present at 0 at % to 50 at %, optionally 1 at % to 50 at %. Optionally, one or more other transition metals are each individually present at 1 at % to 30 at %, optionally 1 at % to 20 at %, optionally 1 at % to 10 at %, 1 at % to 7 at %, 1 at % to 5 at %, 2 at % to 20 at %, 5 at % to 20 at %, 10 at % to 20 at %. Optionally, 1, 2, 3, or more other transition metals other than Ni are present in a transition metal precursor.

An advantage of the processes as provided herein according to some aspects are that raw precursor materials may be used negating the requirement for highly purified or refined materials. For example, when nickel is used as a transition metal precursor, the Ni may be mine grade. A transition metal precursor may be mine grade or may be further processed or refined.

The transition metal precursor is intermixed with a lithium compound and optionally a processing additive to form an active material precursor. The intermixing is optionally performed so as to form a substantially homogenous material whereby excellent mixing of the materials is achieved and intimate contact between the Li compound and the transition metal precursor is achieved. A high shear mixer may be used such as a Kawata Super Piccolo mixer or Eirich mixer. Any suitable mixing blade may be used such as a pin type blade, star type blade, or micro-granulation type blade. The tip speed of the blade correlates to the amount of shear or friction delivered to the material. A tip speed is optionally 5-30 meters/second (m/s), optionally 10-25 m/s.

The stoichiometric ratio of Li to transition metal may be any suitable ratio, optionally from 0.8 to 1.1 or any value or range therebetween. Optionally, the ratio of Li to transition metal may be 0.9 to 1.1, optionally 0.95 to 1.1, optionally 0.95 to 1.05. In the case of a Ni containing active material precursor, the stoichiometric ratio is measured as the ratio between Li and Ni in the material. The stoichiometric ratio of Li to transition metal may be measured by any method known in the art. Illustratively, inductively coupled plasma atomic emission spectroscopy (ICP) or atomic absorption spectroscopy using standard methods optionally as described by J. R. Dean (*Practical Inductively Coupled Plasma Spectroscopy*, Chichester, England: Wiley, 2005, 65-87) and Welz and Sperling (*Atomic Absorption Spectrometry,* 3rd ed., Weinheim, Germany: Wiley VCH, 1999, 221-294). Illustratively, the chemical composition of each sample may be examined by a Varian Liberty 100 inductively-coupled plasma (ICP) system.

In some aspects a processes includes formation of a first active material precursor with a plurality of primary particles having a first grain size. As such, the active material precursor is formed as per traditional techniques and therefore may be defined by parameters such as granule size, porosity, density, among others, that are typical for such materials. Optionally, the first active material precursor is subjected to a calcination reaction to produce a first lithiated transition metal oxide with a plurality of primary particles having a first grain size. This first transition metal oxide is optionally then intermixed with a processing additive and the resulting mixture is subjected to a second calcination reaction so as to produce a second lithiated transition metal oxide with a plurality of primary particles having a second grain size where the second grain size is greater than the first grain size.

Grain size may be determined using any known process, but is optionally obtained by microscopy methods. Optionally, a grain size may be obtained by sieving the material, scanning electron microscopy, transmission electron microscopy, or other suitable methods such as in aspects where grain size is too large for a standard particle size analyzer or the material is unsuitable for analysis in a standard particle analyzer. Optionally, grain size is obtained using a particle analyzer such as a SympaTec Helos particle size analyzer which is capable of measuring particle size up to over 8 millimeters (mm).

In the processes as provided herein, a lithiated transition metal oxide is formed with a plurality of primary particles having a grain size of 0.5 micrometers (μm) or greater where grain size is as related to the diameter of a sphere using methods as recognized in the art. Optionally, a grain size is 0.5 μm to 15 μm or any value or range therebetween. Optionally, a grain size is 2 μm to 15 μm. Optionally, a grain size is 4 μm to 15 μm. Optionally, a grain size is at or greater than 0.5 μm, 0.6 μm, 0.7 μm, 0.8 μm, 0.9 μm, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, or greater. Optionally, a grain size is 0.5 μm to 10 μm, 0.5 μm to 9 μm, 0.5 μm to 8 μm, 0.5 μm to 7 μm, 0.5 μm to 6 μm, 0.5 μm to 5 μm, 0.5 μm to 4 μm, 1 μm to 15 μm, 1 μm to 10 μm, 1 μm to 9 μm, 1 μm to 8 μm, 1 μm to 7 μm, 1 μm to 6 μm, 1 μm to 5 μm, 2 μm to 15 μm, 2 μm to 10 μm, 2 μm to 9 μm, 2 μm to 8 μm, 2 μm to 7 μm, 2 μm to 6 μm, 2 μm to 4 μm, 2 μm to 4 μm, or 2 μm to 3 μm, 4 μm to 15 μm, 4 μm to 10 μm, 4 μm to 9 μm, 4 μm to 8 μm, 4 μm to 7 μm, 4 μm to 6 μm, or 4 μm to 5 μm.

A lithium transition metal oxide optionally includes a plurality of primary particles with a grain size of 2 μm or greater optionally 4 μm or greater, may be formed by combining an active material precursor or one or more transition metal precursors, a lithium compound, and one or more processing additives. A processing additive is a compound that includes potassium, optionally a potassium salt.

In particular aspects, a processing additive is a carbonate or hydroxide of potassium, illustratively $K_2CO_3$ or KOH. Optionally a processing additive excludes KOH.

A processing additive is combined with the other desired materials in the processes as provided herein at a weight percentage of 0.1% to 10% or any value or range therebetween where weight percent is relative to the other materials within active material precursor in sum. Optionally, a processing aid is present at a weight percent of 0.1% to 20%, optionally 0.1% to 10%, optionally 0.1% to 8%, optionally 0.1% to 7%, optionally 0.1% to 5%, optionally 0.1% to 1%, optionally 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 11%, 12%, 13%, 14%, 15%, 16%, 17%, 18%, 19%, 20%, or greater by weight.

The processing aid may be combined with the active material precursor by simple addition, spraying, or other suitable method.

The active material precursor, optionally components thereof, and one or more processing additives, are intermixed so as to provide a coated or substantially uniformly intermixed mixture. The formation of the active material precursor with the processing aid may be performed in the same or a different vessel from the step of intermixing the lithium compound with the transition metal precursor or it may occur in the same vessel.

The resulting lithiated transition metal oxides as provided herein optionally have a crush strength that is lower than compositionally identical materials formed by traditional methods without a processing aid as provided herein. Crush strength may be measured by standard procedures recognized in the art. Optionally, a crush strength is less than 40 Newtons. Optionally, a crush strength is 40 Newtons or less, optionally 35 Newtons or less, optionally 30 Newtons or less, optionally 25 Newtons or less, optionally 20 Newtons or less, optionally 15 Newtons or less, optionally 10 Newtons or less, optionally 9 Newtons or less, optionally 8 Newtons or less, optionally 7 Newtons or less, optionally 6 Newtons or less, optionally 5 Newtons or less, optionally 4 Newtons or less, optionally 3 Newtons or less, optionally Newtons or less. Optionally, a crush strength is 60% or less than crush strength of compositionally identical materials formed by traditional methods without a processing aid as provided herein, optionally 50% or less, optionally 40% or less, optionally 30% or less.

Following formation of an active material precursor alone or in the presence of a processing additive as provided herein, the resulting materials are subjected to a solid phase reaction such as calcination. A saggar may be used for the calcination process of the present disclosure, but the calcination process is improved due to reductions in processing time to achieve the desired grain size of the resulting lithiated transition metal oxide. In addition to standard kilns and saggars, the present materials may be calcined in a fluid bed calciner, a rotary kiln, a roller hearth kiln, or other such device.

The calcination process is performed at a calcination temperature and in an oxidizing atmosphere and for a calcination time suitable for the formation of a lithiated transition metal oxide. A calcination temperature is optionally any temperate at or above 700 degrees Celsius (° C.). A calcination temperature is optionally from 700° C. to 1000° C. or any value or range therebetween. Optionally, a calcination temperature is from 750° C. to 950° C., optionally 750° C. to 900° C.

A calcination time is optionally from 0.2 to 60 hours or any value or range therebetween. Optionally, a calcination time is 0.2 to 50 hours, optionally 1 to 50 hours, optionally 1 to 60 hours, optionally 10 to 50 hours, optionally 10 to 20 hours. Optionally, a calcination time is for less than 60 hours, optionally less than 50 hours, optionally less than 40 hours, optionally less than 30 hours, optionally less than 25 hours, optionally less than 20 hours, optionally less than 15 hours, optionally less than 10 hours.

Calcination is performed in an atmosphere suitable to oxidize the active material precursor. An atmosphere may include a suitable amount or concentration of an oxidizing agent, optionally oxygen, ozone or other suitable agent, the oxidixing atmosphere optionally in the form of an oxygen enriched atmosphere whereby the concentration of oxygen is greater than in ambient earth air at sea level. Optionally, an atmosphere is air. The atmosphere is optionally provided at a suitable pressure, optionally about 1 atmosphere. The atmosphere is optionally contacted with the active material precursor at a flow velocity to provide a desired number of atmosphere exchanges in the oven. The number of atmosphere exchanges per hour is optionally 3 to 150, optionally 3 to 100, optionally 5 to 150, optionally 5 to 100.

A resulting lithium transition metal oxide is optionally subjected to one or more post-calcination processes. In some aspects a lithium transition metal oxide is subjected to crushing, grinding or other process so as to reduce the size of the aggregate or to powderize the aggregate to improve downstream processes, to ensure homogeneity of the mixture and improve its intermixing with a binder, conducting compound or other material suitable for the formation of an electrode.

The lithium transition metal oxide may be used in a primary or secondary electrochemical cell. When used in a primary electrochemical cell, the lithium transition metal oxide may be subjected to a precharging step as is recognized in the art prior to its incorporation into a primary cell.

Various aspects of the present invention are illustrated by the following non-limiting examples. The examples are for illustrative purposes and are not a limitation on any practice of the present invention. It will be understood that variations and modifications can be made without departing from the spirit and scope of the invention.

EXAMPLES

Example 1

An active material precursor is formed using refined nickel hydroxide. 6.7 g nickel hydroxide (as described in U.S. Pat. Nos. 6,432,580 and 6,444,363), 3.35 g lithium hydroxide ($LiOH*H_2O$) and 0.1 g of $K_2CO_3$ (2 wt % (relative to the nickel hydroxide)). The materials are dry mixed to homogeneity using a SPEX CETRIPREP 8000 mixer/miller for 20 minutes. As a control, the compositionally identical materials are formed with the exclusion of the $K_2CO_3$.

The resulting active material precursors are subjected to calcination at 885° C. with flowing $O_2$ at a flow rate of 21 SCFH (about 100 exchange rate). Calcination is performed for 15 hours. Some of the resulting calcined granules are crushed by hand using a mortar and pestle and optionally precharged by standard techniques for downstream electrochemical analyses.

Particle topologies of materials formed in the absence or presence of $K_2CO_3$ are studied by SEM using a JEOL-JSM6320F scanning electron microscope (SEM, JEOL, Tokyo, Japan) with energy dispersive spectroscopy (EDS) with corresponding micrographs illustrated in 2A and 2B respectively. The primary particles in the lithiated transition metal oxides demonstrate relatively small primary particle grain size with an average size after wash of typically less than 3.6 μm. In contrast, when the active material precursors are formed in the presence of $K_2CO_3$ as a processing additive, the resulting primary particle grain size averages typically 7.88 μm or greater.

The lithiated transition metal oxide materials are crushed and subjected to precharging per standard procedures for subsequent electrochemical analyses. Electrochemical studies are performed in half cell configuration against a Hg/HgO reference electrode and in a 30% KOH solution. The lithiated transition metal oxide materials are formed into a cathode powder for testing by mixing with teflonized acetylene black (TAB-2) at 50% w/w and compacting onto a nickel screen. Cells are discharged continuously at constant rate of 9 mA/g down to −0.8V vs. an Hg/HgO reference electrode. The resulting capacities of the materials, particle size and crush strength are illustrated in Table 1.

TABLE 1

| Composition $LiOH/Li_2CO_3/K_2CO_3/Ni(OH)_2$ (Mole %) | Calcination time (hrs) | Calcination temp. degrees C. | Particle size (μm) | Capacity (mAh/g) | Av capacity (mAh/g) | Crush Strength (Newtons) |
|---|---|---|---|---|---|---|
| 1.1/0/0/1.0 | 15 | 885 | 3.61 | 115; 132 | 124 | 9 |
| 1.05/0.025/0/1.0 | 15 | 885 | 3.98 | 125; 126 | 126 | 10 |
| 1.1/0.0/0.05/1.0 | 15 | 885 | 7.88 | 152; 164 | 158 | 5 |

Example 2

Lithiated cathode materials of $LiNi_{0.8}Co_{0.1}Mn_{0.1}O_2$ are prepared by adding 5 grams of precursor $Ni_{0.8}Co_{0.1}Mn_{0.1}(OH)_2$ to 1.4 grams of LiOH and 0.1 g of $K_2CO_3$ (2 wt % (relative to the mixed metal hydroxide)). Control materials are formed identically but in the absence of $K_2CO_3$. The materials are mechanically mixed with SPEX CETRIPREP 8000 mixer/miller for 20 minutes. The resulting powdered mixture is then sintered at 850° C. for 15 hours. The resulting lithiated composite material is then cooled to 25° C.

Particle topologies of the NCM 811 materials formed in the absence or presence of $K_2CO_3$ are studied by SEM using a JEOL-JSM6320F scanning electron microscope (SEM, JEOL, Tokyo, Japan) with energy dispersive spectroscopy (EDS) with corresponding micrographs illustrated in 3A and 3B respectively. The relative particle sizes are illustrated in Table 2.

TABLE 2

Average grain sizes for NCM materials made in the presence of absence of $K_2CO_3$.

| Sample | Particle Size (following delitiation) μm |
|---|---|
| NCM 811 | 3.71 |
| NCM 811 treated with 2 wt % $K_2CO_3$ | 6.48 |

For electrochemical analyses, the resulting materials following calcination are and ground in a mortar/pestle and precharged by standard techniques. The delithiated cathode materials are studied for capacity levels and cycle life in CR2032 coin cells using lithium metal as counter electrode. The lithiated composite materials are formed into a cathode powder for testing by mixing with carbon Super 65 from Timcal (7.5 wt %), graphite KS10 from Timcal (7.5 wt %) and 6 wt % PVDF (Kynar) binder. Anhydrous solvent (1-methyl-2pyrrolidinone) was then added to the powder mix to form a slurry. The slurry was then coated on an aluminum substrate. The coating was dried at 85° C. for several hours and calendared to the final thickness about 60 μm. The cathode and anode materials are separated by a microporous polypropylene separator (MTI corporation) that was wetted with electrolyte consisting of a 1M solution of $LiPF_6$ dissolved in a 1:1:1 volume mixture of ethylene carbonate (EC), dimethyl carbonate (DMC), and diethyl carbonate (DEC) from Novolyte Corporation. The cell was crimped and used to probe the capacity and cycle life of the lithiated composite material. Cell assembly and crimping was done in glove box.

Tests of the cathode materials were run at constant current charge and discharge (0.1 C) to determine capacity and cycleability using Solatron 1470 Battery Test Unit and Arbin Instruments battery testerpower system. The coin cells were charged and discharged at a voltage between 4.3V and 3.0V. The cycling performance test was performed with a charge and discharge current each at 18 mA/g.

The foregoing description of particular aspect(s) is merely exemplary in nature and is in no way intended to limit the scope of the invention, its application, or uses, which may, of course, vary. The disclosure is provided with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Various modifications of the present invention, in addition to those shown and described herein, will be apparent to those skilled in the art of the above description. Such modifications are also intended to fall within the scope of the appended claims.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular aspects of the invention, but is not meant to be a limitation upon the practice thereof.

The invention claimed is:

1. A process for the formation of a lithiated transition metal oxide comprising:

intermixing a nickel containing material and a lithium compound to form an active material precursor;

heating the active material precursor to a temperature of 700° C. or greater in an oxidizing atmosphere, the heating for a calcination time sufficient to form a first lithiated transition metal oxide having a plurality of primary particles having a first grain size;

intermixing the first lithiated transition metal oxide with a processing additive comprising potassium carbonate to form a second active material precursor; and heating the second active material precursor to a temperature of 700° C. or greater in an oxidizing atmosphere to form second lithiated transition metal oxide particles with a plurality of primary particles having a second grain size, whereby the second grain size is larger than the first grain size.

2. The process of claim 1 wherein the second lithiated transition metal oxide particles have a plurality of primary particles with a second grain size of 2 μm or greater.

3. The process of claim 1 wherein the second grain size is 6 μm to 15 μm.

4. The process of claim 1 wherein the nickel containing material comprises nickel monoxide, nickel hydroxide, nickel oxyhydroxide, nickel sesquioxide, nickel carbonate, nickel nitrate, or any combination thereof.

5. The process of claim 1 wherein the nickel containing material further comprises Al, Co, Mn, or any combination thereof.

6. The process of claim 1 wherein the lithium compound is selected from the group consisting of lithium hydroxide, lithium oxide, lithium carbonate, lithium nitrate, lithium sulfate, lithium acetate, lithium peroxide, lithium hydrogen carbonate, a lithium halide, and combinations thereof.

7. The process of claim 1 wherein the processing additive is present at 0.5 weight percent to 5 weight percent of active material precursor as a whole.

8. The process of claim 1 wherein the processing additive excludes KOH.

9. A process for the formation of a lithiated transition metal oxide comprising:

intermixing a nickel containing material and a lithium compound to form an active material precursor;

heating the active material precursor to a temperature of 700° C. or greater in an oxidizing atmosphere, the heating for a calcination time sufficient to form a first lithiated transition metal oxide having a plurality of primary particles having a first grain size;

intermixing the first lithiated transition metal oxide with a processing additive comprising potassium carbonate, wherein the processing additive excludes KOH, to form a second active material precursor; and heating the second active material precursor to a temperature of 700° C. or greater in an oxidizing atmosphere to form second lithiated transition metal oxide particles with a plurality of primary particles having a second grain size, whereby the second grain size is larger than the first grain size, wherein the second grain size is 2 μm or greater.

* * * * *